United States Patent
Gaebelein et al.

(10) Patent No.: US 10,940,561 B2
(45) Date of Patent: Mar. 9, 2021

(54) METHODS AND APPARATUS TO PERFORM A LIQUID-JET GUIDED LASER PROCESS AND TO SIMPLIFY THE MAINTENANCE THEREOF

(71) Applicant: Avonisys AG, Zug (CH)

(72) Inventors: Jens Guenter Gaebelein, Freienfeld (IT); Jeroen Hribar, Lucerne (CH)

(73) Assignee: Avonisys AG

( * ) Notice: Subject to any disclaimer, the term of this patent is extended or adjusted under 35 U.S.C. 154(b) by 203 days.

(21) Appl. No.: 16/032,092

(22) Filed: Jul. 11, 2018

(65) Prior Publication Data

US 2018/0318959 A1    Nov. 8, 2018

Related U.S. Application Data

(63) Continuation of application No. 14/568,134, filed on Dec. 12, 2014, now Pat. No. 10,022,820.
(Continued)

(51) Int. Cl.
*B23K 26/146*    (2014.01)
*B23P 17/02*    (2006.01)
(Continued)

(52) U.S. Cl.
CPC ........ *B23K 26/146* (2015.10); *B22D 19/0072* (2013.01); *B23K 26/0608* (2013.01);
(Continued)

(58) Field of Classification Search
CPC .............. B23K 26/389; B23K 26/0622; B23K 26/0648; B23K 26/142; B23K 26/1462; B23K 26/146; B23K 26/1458; B23K 26/1464; B23K 26/1482; B23K 26/1476; B23K 26/14; B23K 26/1417;
(Continued)

(56) References Cited

U.S. PATENT DOCUMENTS 3,569,660 A * 3/1971 Houldcroft .......... B23K 26/147
                                                         219/121.68
4,324,972 A * 4/1982 Furrer .................... B23K 26/02
                                                         219/121.63
(Continued)

FOREIGN PATENT DOCUMENTS

JP    63215392 A * 9/1988
JP    01249289 A * 10/1989
(Continued)

*Primary Examiner* — Jimmy Chou
(74) *Attorney, Agent, or Firm* — patent2ip LLC; Tue Nguyen

(57) ABSTRACT

A removably attached coupling assembly can be used to be attached to a laser focus optic assembly of a liquid jet guided laser system. The coupling assembly can include a coupling body, a window assembly, and a nozzle assembly. The coupling assembly thus can allow the independent and separate servicing of the window and the nozzle. For example, to service the window, the coupling assembly can be first detached from the laser focus optic assembly, exposing the top portion of the coupling assembly. The window assembly then can be detached from the coupling assembly. The window can be removed from the window assembly for servicing, such as being repaired or replaced.

19 Claims, 16 Drawing Sheets

Related U.S. Application Data

(60) Provisional application No. 61/915,510, filed on Dec. 13, 2013.

(51) Int. Cl.
| | |
|---|---|
| *B23K 26/14* | (2014.01) |
| *B23K 26/0622* | (2014.01) |
| *B23K 26/382* | (2014.01) |
| *B23K 26/38* | (2014.01) |
| *B23K 26/142* | (2014.01) |
| *B22D 19/00* | (2006.01) |
| *B29D 30/06* | (2006.01) |
| *B29C 33/10* | (2006.01) |
| *B29C 33/38* | (2006.01) |
| *B23K 26/06* | (2014.01) |
| *B23K 103/16* | (2006.01) |
| *B23P 19/04* | (2006.01) |
| *B33Y 10/00* | (2015.01) |
| *B33Y 80/00* | (2015.01) |

(52) U.S. Cl.
CPC ...... *B23K 26/0622* (2015.10); *B23K 26/0648* (2013.01); *B23K 26/142* (2015.10); *B23K 26/1462* (2015.10); *B23K 26/1464* (2013.01); *B23K 26/1482* (2013.01); *B23K 26/38* (2013.01); *B23K 26/389* (2015.10); *B23P 17/02* (2013.01); *B29C 33/10* (2013.01); *B29C 33/3842* (2013.01); *B29D 30/0606* (2013.01); *B29D 30/0629* (2013.01); *B23K 2103/16* (2018.08); *B23P 19/047* (2013.01); *B29D 2030/062* (2013.01); *B29D 2030/0613* (2013.01); *B29D 2030/0617* (2013.01); *B33Y 10/00* (2014.12); *B33Y 80/00* (2014.12); *Y10T 29/49721* (2015.01); *Y10T 29/49995* (2015.01); *Y10T 29/49996* (2015.01)

(58) Field of Classification Search
CPC .......... B23K 26/0608; B23K 26/38; B23K 2103/16; B22D 19/0072; B29C 33/10; B29C 33/3842; B33Y 10/00; B33Y 80/00; Y10T 29/49721; Y10T 29/49995; Y10T 29/49996; B23P 19/047; B23P 17/02; B29D 2030/0613; B29D 2030/0617; B29D 2030/062; B29D 30/0606; B29D 30/0629
USPC .......... 219/181.84, 121.67, 121.63
See application file for complete search history.

(56) References Cited

U.S. PATENT DOCUMENTS

| | | | | |
|---|---|---|---|---|
| 5,298,716 A * | 3/1994 | Ogawa | B23K 26/046 | 219/121.67 |
| 5,418,350 A * | 5/1995 | Freneaux | B05B 7/228 | 219/121.64 |
| 5,426,278 A * | 6/1995 | Hirano | B23K 26/106 | 219/121.63 |
| 5,902,499 A * | 5/1999 | Richerzhagen | B23K 26/06 | 219/121.67 |
| 6,388,227 B1 * | 5/2002 | Dykhno | B23K 26/1429 | 219/121.45 |
| 6,534,745 B1 * | 3/2003 | Lowney | B23K 26/1482 | 219/121.84 |
| 7,705,266 B2 * | 4/2010 | Koseki | B23K 26/02 | 219/121.67 |
| 7,919,727 B2 * | 4/2011 | Nishiya | B23K 26/1476 | 219/121.6 |
| 8,134,098 B2 * | 3/2012 | Muratsubaki | B23K 26/146 | 219/121.67 |
| 8,800,480 B2 * | 8/2014 | Whitfield | C23C 26/02 | 118/641 |
| 8,829,393 B2 * | 9/2014 | Jennings | B23K 26/032 | 219/121.8 |
| 8,946,588 B2 * | 2/2015 | Suruceanu | B23K 26/382 | 219/121.71 |
| 10,022,820 B2 * | 7/2018 | Gaebelein | B23K 26/38 | |
| 10,092,980 B1 * | 10/2018 | Gaebelein | B23K 26/1417 | |
| 10,160,059 B2 * | 12/2018 | Hu | B23K 26/1482 | |
| 10,668,563 B2 * | 6/2020 | Nagata | B23K 26/16 | |
| 2002/0036190 A1 * | 3/2002 | Tamura | B23K 26/03 | 219/121.63 |
| 2003/0102294 A1 * | 6/2003 | Kinbara | B23K 26/04 | 219/121.83 |
| 2005/0056628 A1 * | 3/2005 | Hu | B23K 26/144 | 219/121.84 |
| 2005/0109745 A1 * | 5/2005 | Wessner | B23K 26/0643 | 219/121.84 |
| 2005/0133486 A1 * | 6/2005 | Baker | B23K 26/0096 | 219/121.63 |
| 2006/0175307 A1 * | 8/2006 | Hughes | B23K 26/1464 | 219/121.63 |
| 2006/0249488 A1 * | 11/2006 | Jurgensen | B23K 26/142 | 219/121.68 |
| 2006/0278619 A1 * | 12/2006 | Acker | B23K 26/40 | 219/121.67 |
| 2007/0012669 A1 * | 1/2007 | Mori | B23K 26/123 | 219/121.84 |
| 2007/0051710 A1 * | 3/2007 | Odanaka | B23K 26/16 | 219/121.84 |
| 2007/0071907 A1 * | 3/2007 | Stiles | C23C 26/02 | 427/554 |
| 2007/0084839 A1 * | 4/2007 | Zhang | B23K 26/146 | 219/121.84 |
| 2007/0193981 A1 * | 8/2007 | Peng | B23K 26/144 | 219/121.33 |
| 2007/0221023 A1 * | 9/2007 | Yoshida | B23H 7/02 | 83/53 |
| 2007/0228025 A1 * | 10/2007 | Horn | B23K 26/1476 | 219/121.78 |
| 2007/0262063 A1 * | 11/2007 | Sano | B23K 26/067 | 219/121.85 |
| 2008/0169275 A1 * | 7/2008 | Koseki | B26F 3/004 | 219/121.75 |
| 2009/0045177 A1 * | 2/2009 | Koseki | B23K 26/0643 | 219/121.67 |
| 2009/0084765 A1 * | 4/2009 | Muratsubaki | B23K 26/146 | 219/121.67 |
| 2010/0108648 A1 * | 5/2010 | Koseki | B26F 3/004 | 219/121.67 |
| 2011/0240615 A1 * | 10/2011 | Suruceanu | B23K 26/40 | 219/121.71 |
| 2012/0074110 A1 * | 3/2012 | Zediker | B23K 26/1224 | 219/121.72 |
| 2012/0298649 A1 * | 11/2012 | Nagata | B23K 26/16 | 219/243 |
| 2013/0298387 A1 * | 11/2013 | Kobier | H01M 10/0413 | 29/623.1 |
| 2015/0165559 A1 * | 6/2015 | Gaebelein | B23K 26/0608 | 219/121.67 |
| 2015/0209899 A1 * | 7/2015 | Hu | B23K 26/0006 | 219/121.71 |
| 2017/0252865 A1 * | 9/2017 | Hu | B23K 26/146 | |
| 2017/0320166 A1 * | 11/2017 | Zhang | B23K 26/389 | |

FOREIGN PATENT DOCUMENTS

| | | |
|---|---|---|
| JP | 2622350 | 6/1995 |
| JP | 2000334590 | 12/2000 |
| JP | 5324828 | 12/2009 |

\* cited by examiner

```
┌─────────────────────────────────────┐
│ Forming a window assembly, wherein  │
│ the window assembly comprises a     │
│ window for a liquid jet guided laser│
│ system                              │
│ 400                                 │
└─────────────────────────────────────┘
                  │
                  ▼
┌─────────────────────────────────────┐
│ Forming a nozzle assembly, wherein  │
│ the nozzle assembly comprises a     │
│ nozzle for the liquid jet guided    │
│ laser system                        │
│ 410                                 │
└─────────────────────────────────────┘
                  │
                  ▼
┌─────────────────────────────────────┐
│ Forming a coupling body, wherein    │
│ the coupling body is configured to  │
│ accept the window assembly at a top │
│ end of the coupling body, wherein   │
│ the coupling body is configured to  │
│ accept the nozzle assembly at a     │
│ bottom end opposite the top end,    │
│ wherein the coupling assembly is    │
│ configured to be coupled to a laser │
│ focus optic assembly of the liquid  │
│ jet guided laser system             │
│ 420                                 │
└─────────────────────────────────────┘
                  │
                  ▼
┌─────────────────────────────────────┐
│ Forming a coupling assembly,        │
│ wherein the coupling assembly       │
│ comprises the coupling body, the    │
│ window assembly coupled to the      │
│ coupling body, and the nozzle       │
│ assembly coupled to the coupling    │
│ body                                │
│ 430                                 │
└─────────────────────────────────────┘
                  │
                  ▼
┌─────────────────────────────────────┐
│ Coupling the coupling assembly to   │
│ the laser focus optic assembly of   │
│ the liquid jet guided laser system  │
│ 440                                 │
└─────────────────────────────────────┘
```

Fig. 4

Providing a liquid jet guided layer system having a coupling assembly, wherein the coupling assembly is coupled to the liquid jet guided laser system, wherein the coupling assembly comprises a coupling body, a window assembly coupled to a top end of the coupling body, and a nozzle assembly coupled to a bottom end of the coupling body, wherein the bottom end is opposite to the top end
1000

Removing the nozzle assembly from the coupling assembly
1010

Removing a nozzle from the removed the nozzle assembly
1020

Installing a new nozzle to the nozzle assembly
1030

Assembling the nozzle assembly to the coupling assembly
1040

Fig. 10

Coupling a coupling assembly to a liquid jet guided laser system through a motion controller
1500

Moving the coupling assembly relative to the laser focus optic assembly of the liquid jet guided laser system through the motion controller
1510

Fig. 15

METHODS AND APPARATUS TO PERFORM A LIQUID-JET GUIDED LASER PROCESS AND TO SIMPLIFY THE MAINTENANCE THEREOF

This application is a continuation of and claims priority from U.S. patent application Ser. No. 14/568,134 filed on Dec. 12, 2014, entitled "Methods and apparatus to perform a liquid-jet guided laser process and to simplify the maintenance thereof", which claims priority from provisional patent application Ser. No. 61/915,510, filed on Dec. 13, 2013, entitled "Methods and systems to keep a work piece surface free from liquid accumulation while performing liquid-jet", which is incorporated herein by reference in its entirety for all purposes.

BACKGROUND

Laser technology is applied for a large variety of material processing tasks, such as cutting, drilling, welding, marking, engraving and material ablation. Nearly all materials can be processed, e.g. metals, metal alloys, ceramics, diamonds, synthetic diamonds, carbon fibres, sapphire, quartz, glass, plastics and more. In almost every case, the laser light is focused into a very small spot onto the work piece using a focusing lens, to enable the processing task by generating sufficient energy on the work piece. The work piece therefore has to be precisely aligned into the laser focus throughout the processing task.

Liquid-jet guided laser technology, as for example described in patent EP1940579B1 and U.S. Pat. No. 8,859,988B1, which are hereby incorporated by reference in their entirety for all purposes, couples the laser focus into a small liquid-jet, for example, through a focusing lens. This coupling takes place in a coupling unit. The coupling unit can include a metal chamber that on the side of the focusing lens is closed with a laser protection window. On the opposite side the chamber carries a nozzle. Liquid provided to the coupling unit flows between window and nozzle and leaves the nozzle in form of a liquid-jet. The energy of the laser spot in the focal plane is captured inside the liquid-jet and guided to the work piece through internal reflection. This method eliminates the necessity to control the distance of the work piece precisely because the required energy to perform the processing is available throughout the laminar length of the liquid-jet. Any liquid that provides suitable light guide capabilities can be used to form the liquid-jet.

There is a need for improving the liquid-jet laser technology, for example, to allow ease of servicing the laser protection window and the nozzle.

SUMMARY OF THE EMBODIMENTS

In some embodiments, the present invention discloses methods and systems to improve the services and operation of a liquid jet guided laser system. The components of the liquid jet guided laser system, such as the laser protection window and the nozzle, can be independently and separately removed, serviced and re-installed, without affecting the operation of the other components. For example, the independent servicing of the window without disturbing the nozzle can greatly simplify the operation and maintenance of the liquid jet guided laser system.

In some embodiments, the present invention discloses assembling the window and the nozzle in opposite external surfaces of a coupling assembly. Since the window and the nozzle are assembled to external surfaces of the coupling assembly, either one of the window and the nozzle can be removed and re-assembled without disturbing the other. The coupling assembly can be removably attached to a laser focus optic assembly of the liquid jet guided laser system, e.g., the coupling assembly can be removed and re-attached to the laser focus optic assembly without losing position precision and accuracy of the components such as the window and the nozzle.

Thus the coupling assembly can allow the independent and separate servicing of the window and the nozzle. For example, to service the window, the coupling assembly can be first de-coupled from the laser focus optic assembly, exposing the top portion of the coupling assembly. The window can be removed from the coupling assembly for servicing, such as being repaired or replaced. After completing servicing, the window can be re-assembled to the coupling assembly, and the coupling assembly can be re-coupled to the laser focus optic assembly.

BRIEF DESCRIPTION OF THE DRAWINGS

FIG. 4 illustrates a flow chart for forming a liquid jet guided laser system according to some embodiments.

FIG. 10 illustrates a flow chart for servicing a nozzle in a liquid jet guided laser system according to some embodiments.

FIG. 15 illustrates a flow chart for operating a liquid jet guided laser system according to some embodiments.

DETAILED DESCRIPTION OF THE EMBODIMENTS

In some embodiments, the present invention discloses methods and systems for ease of servicing a liquid jet guided laser system. The laser protection window and the nozzle can be independently and separately removed, serviced and re-installed. Since the window and the nozzle have different life time, servicing schedule, and damage tolerance, the independent servicing of the window and the nozzle, e.g., either the window and the nozzle can be serviced without disturbing the other, can greatly simply the operation and maintenance of the liquid jet guided laser system.

In some embodiments, the present invention discloses a coupling assembly that is configured to be coupled to a laser focus optic assembly of a liquid jet guided laser system. The laser focus optic assembly can provide a focused laser beam, and can include a laser generator and an optical element, such as a lens, for focusing the laser beam. The laser focus optic assembly can be provided in a system housing. The coupling assembly can be removably coupled to the laser focus optic assembly, for example, attaching to the system housing by a securing mechanism.

The coupling assembly can include a coupling body, a window assembly including a window coupled to a top portion of the coupling body, and a nozzle assembly including a nozzle coupled to a bottom portion of the coupling body, which is opposite to the top portion. Thus when the coupling assembly is assembled to the laser focus optic assembly, the window assembly is configured to face the laser focus optic assembly, and the nozzle assembly is configured to be spaced from the laser focus optic assembly by the window assembly.

The coupling assembly thus can allow the independent and separate servicing of the window and the nozzle. For example, to service the window, the coupling assembly can be first de-coupled from the laser focus optic assembly, exposing the top portion of the coupling assembly. The window assembly then can be de-coupled from the coupling assembly. The window can be removed from the window assembly for servicing, such as being repaired or replaced. After completing servicing, the window assembly can be re-coupled to the coupling assembly, and the coupling assembly can be re-coupled to the laser focus optic assembly.

In some embodiments, the coupling assembly can be coupled to the laser focus optic assembly through a motion mechanism. Thus the coupling assembly can be moved relative to the laser focus optic assembly. The motion mechanism can be configured so that the coupling assembly can be moved in a plane perpendicular to the laser beam, or parallel to the focus lens of the laser focus optic assembly. Thus the laser can be focused onto the liquid jet, e.g., the nozzle can be adjusted so that the laser beam can pass through the opening in the nozzle.

Figure 1:
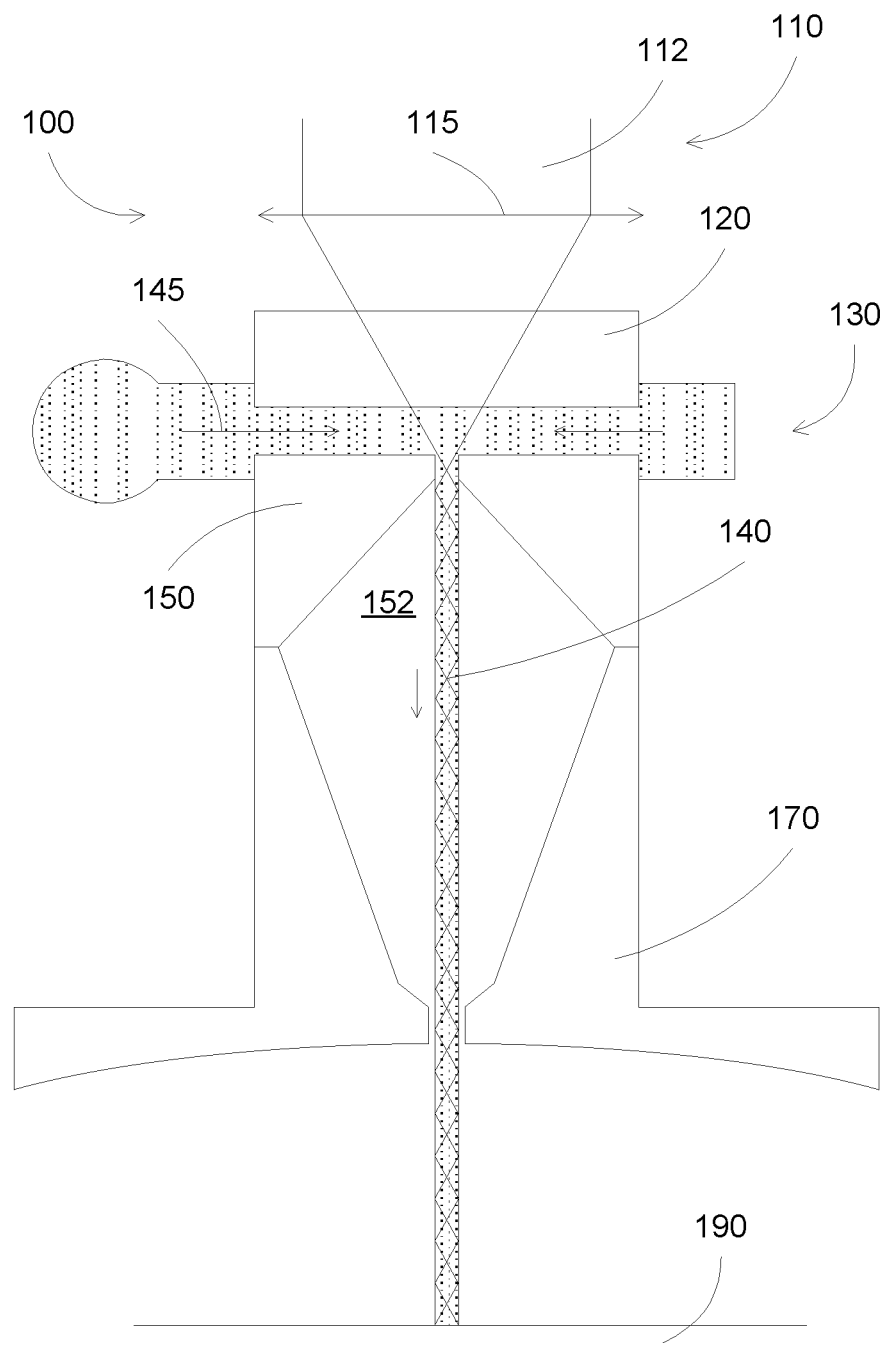
FIG. 1 illustrates a schematic of a liquid jet guided laser system according to some embodiments.

FIG. 1 illustrates a schematic of a liquid jet guided laser system according to some embodiments. A liquid jet guided laser beam system 100 can include a coupling assembly 130 coupled to a laser focus optic assembly 110. The laser focus optic assembly 110 can include a laser beam 112 and an optical element such as a focus lens 115. The coupling assembly 130 can include a window 120 and a nozzle 150. The nozzle 150 can be coupled to the window 120, leaving a small gap for accepting a liquid, such as water, from a liquid source. The nozzle has a opening in the middle for the liquid to exit as a liquid jet. The nozzle is open at an opposite end. An end portion 170 can be coupled to the nozzle 150, which can be configured to form a cavity 152, which is coupled with the open end of the nozzle 150, and which can improve the laminar flow of the liquid jet, for example, such stability can be achieved with a vacuum compensation feature, e.g., in an air-jet nozzle, as disclosed below. The window 120 can be used to separate the dry portion of a laser focus optic assembly 110 and the liquid portion of a liquid jet 140.

In operation, a liquid, such as water 145, can be provided to the nozzle 150, and travel through the opening of the nozzle to form a liquid jet 140. The laser beam 112 can be focused, for example, by the lens 115, to the liquid jet 140. Internal reflection can confined the laser beam to be within the liquid jet, e.g., the laser beam is guided by the liquid jet 140. For example, the internal reflection of the laser can start below the nozzle. The liquid jet guided laser beam can flow toward an object surface 190, where the laser can cut through the object by means of material ablation in a single or multiple passes.

Figure 2A:
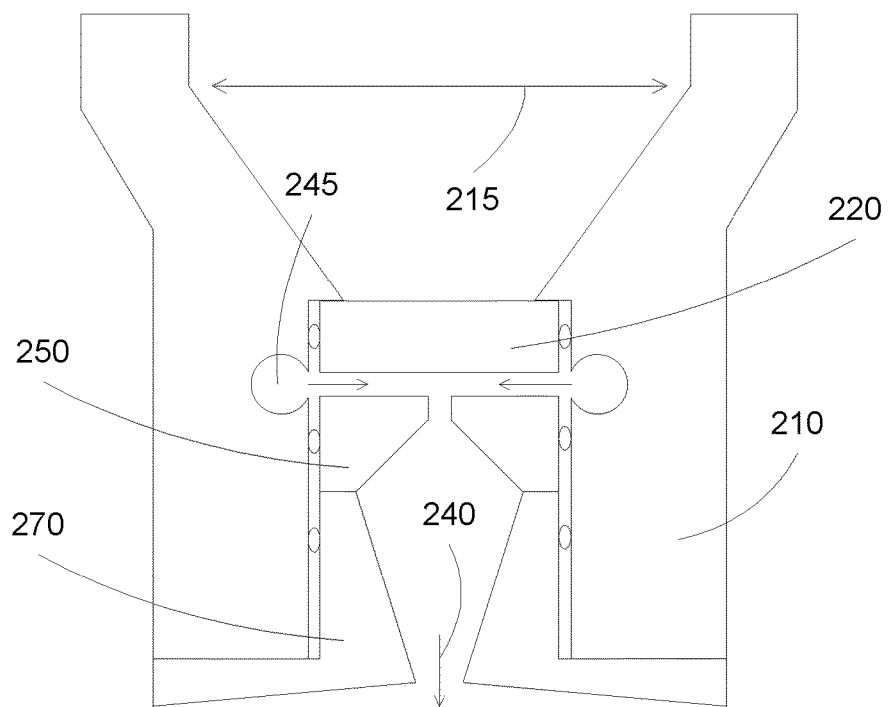
FIGS. 2A-2D illustrate a prior art liquid jet guided laser system according to some embodiments.

FIGS. 2A-2D illustrate a prior art liquid jet guided laser system according to some embodiments. In FIG. 2A, a system body 210 is configured to house the laser focus optic assembly, including a lens 215. For example, the lens can be mounted in the laser focus optic assembly. A window 220 and a nozzle 250, as part of a coupling unit, can also be mounted to the laser focus optic assembly. The window 220 and the nozzle 250 can be placed inside a holder (not shown). The coupling unit can include other components, such as an end portion 270. A liquid inlet 245 can be provided in the system body, for providing a liquid flow to form a liquid jet 240.

Figures 2B, 2C, 2D:
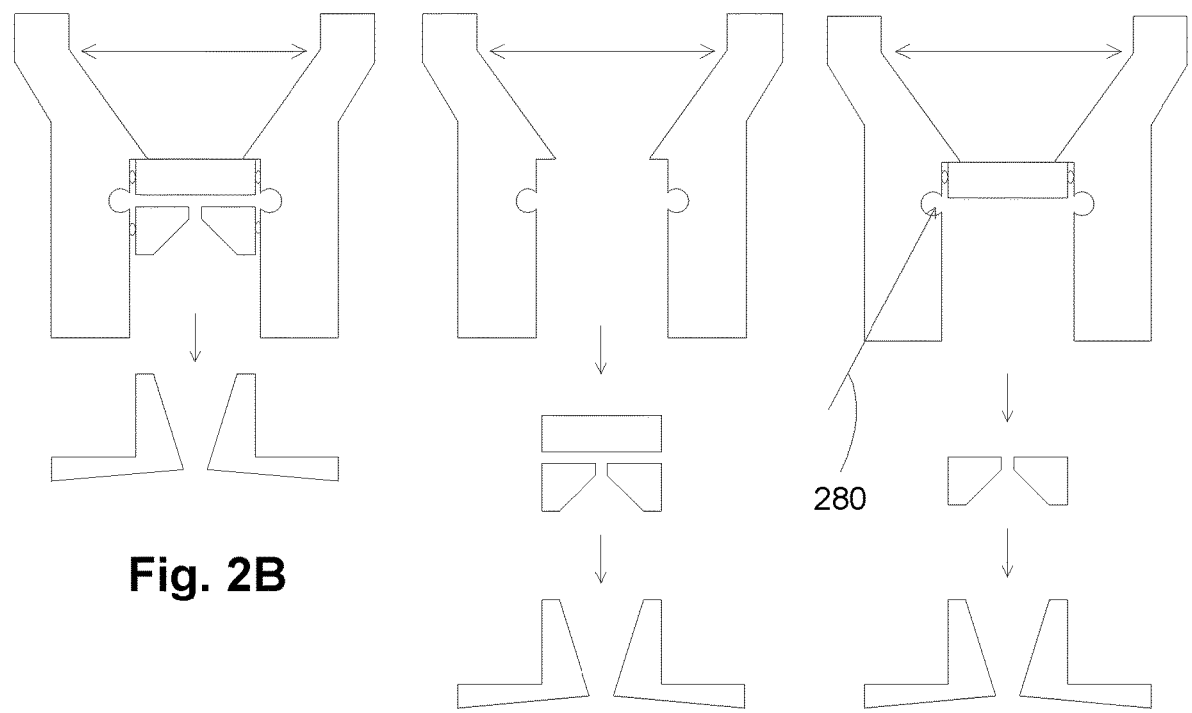

For servicing, the end portion 270 can be first removed from the system body (FIG. 2B). Different methods can be used to remove the window and the nozzle, depending on the window and nozzle configurations. For example, as shown in FIG. 2C (and exemplified in the patent EP1833636B1), the window 220 and the nozzle 250 can be removed together, for example, by applying a force to the window from the laser portion, to push out the window and the nozzle. Afterward, the window 220 can be separated from the nozzle 250. Alternatively, as shown in FIG. 2D, the nozzle 250 can be removed by applying a pressure 280, e.g., liquid or gas, to the liquid jet inlet 245. The high pressure can push out the nozzle 250. The window 220 can be removed by applying a force from the laser portion.

During assembling, the window can be first inserted through an opening in the bottom of the system assembly. The window can be optionally glued to the unit body for sealing it. The glue can require multiple hours to cure into a water-tight seal. The nozzle can be inserted through the same opening. This assembling process can result in maintenance time of hours (instead of minutes). The gluing process can also require to physically break the window for its removal, or for the removal of the nozzle by pressing it out by applying pressure from the window side.

Since the components, e.g., the window and the nozzle, can be fragile, after removal, the components can be damaged and might have to be replaced. For example, to replace the window, the nozzle will need to be removed first. After the new window is placed back to the system body, a new nozzle might be needed, since the old nozzle can be damaged in the removal process. The window can also be damaged when it is pushed out to remove the nozzle.

The potential damage can be detrimental especially during a nozzle exchange process. Due to cutting requirements, different nozzles can be used, which requires changing a good nozzle by another good nozzle. For example, changing a 80 micron nozzle to a 50 micron nozzle. The nozzle exchange process can damage the window if the window/nozzle assembly is pushed out by applying pressure above the window.

In some embodiments, the present invention discloses a coupling assembly that can be removably coupled to a laser focus optic assembly of a liquid jet guided laser system. The coupling assembly can be coupled to the laser focus optic assembly for operating the liquid jet guided laser system. The coupling assembly can be removed from the laser focus optic assembly for servicing the components of the coupling assembly, such as a window or a nozzle.

In some embodiments, the present invention discloses systems and methods for improved servicing a liquid jet guided laser system, including independently and separately servicing the window and the nozzle of the liquid jet guided laser system. For example, the nozzle can be accessed from a bottom portion, without disturbing the window in a top portion. Similarly, the window can be accessed from a top portion, without disturbing the nozzle in a bottom portion. Since the window is placed between the laser focus optic assembly and the nozzle, a coupling assembly can be introduced, which can allow the separation of the window from the laser focus optic assembly.

In some embodiments, the coupling assembly can include a coupling body, which can be coupled to the laser focus optic assembly, for example, through an attaching mechanism such as a bolting mechanism. A window assembly, which includes a window, can be coupled to the coupling body. A nozzle assembly, which includes a nozzle, can also be coupled to the coupling body. The window assembly is configured to be placed between the laser focus optic assembly and the nozzle assembly, thus the window assembly and the nozzle assembly can be coupled to the coupling assembly at opposite ends, and the window assembly can be facing the laser focus optic assembly when the coupling assembly is coupled to the laser focus optic assembly.

The coupling assembly can allow the exposure of the window, so that the window can be serviced without disturbing the nozzle. For example, the coupling assembly can be removed from the laser focus optic assembly, exposing the top portion, e.g., the portion that is attached to the laser focus optic assembly. Since the window is disposed in a window assembly that is attached from the top portion, the window assembly can be removed from the coupling assembly, after the coupling assembly is removed from the laser focus optic assembly. During all of these actions, the nozzle is still disposed in a nozzle assembly that is attached to the bottom portion of the coupling assembly. Thus the nozzle is not affected, e.g., the nozzle position is not disturbed and can still be used in the laser system. For example, after the coupling assembly is re-coupled to the laser focus optic assembly (after the window is serviced), the nozzle is returned to the previous operating position, e.g., the operating position before the window is removed.

Figure 3:
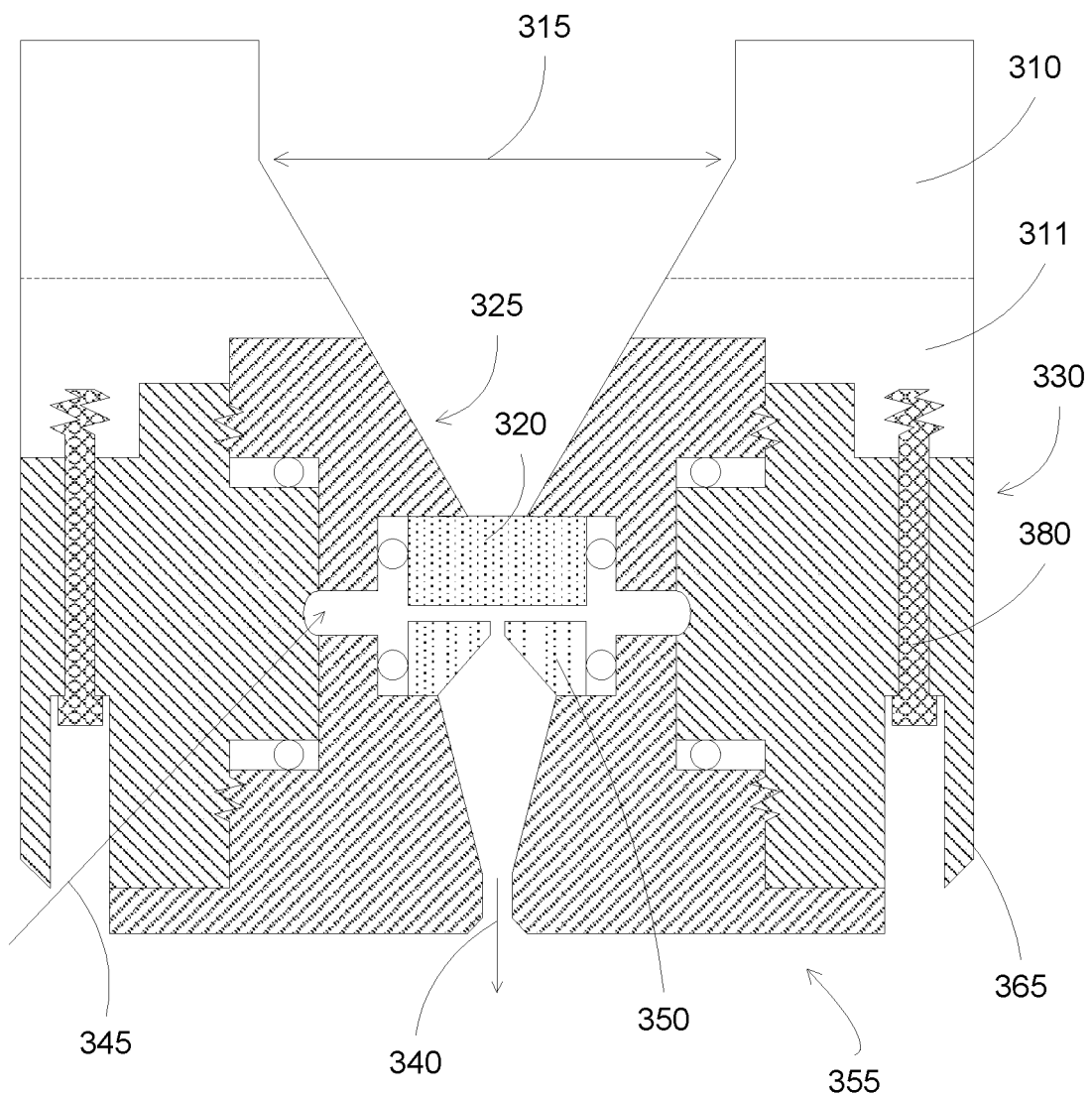
FIG. 3 illustrates a coupling assembly in a liquid guided laser system according to some embodiments.

FIG. 3 illustrates a coupling assembly in a liquid guided laser system according to some embodiments. A liquid jet guided laser system can include a laser focus optic assembly 310, which can be configured to house a laser and an optical element 315 for transmitting and focusing the laser beam. A coupling assembly 330 can be coupled to the laser focus optic assembly 310, for example, by an attaching mechanism such as a bolting mechanism 380. The attaching mechanism 380 can allow coupling and de-coupling of the coupling assembly 330 with the laser focus optic assembly 310. The coupling assembly is shown as being coupled directly to the laser focus optic assembly, but other configurations can also be used. For example, the coupling assembly 330 can be coupled to an interface 311 to the laser focus optic assembly, 310 e.g., the coupling assembly 330 can be coupled to the laser focus optic assembly 310 through the interface 311, such as an adapter or a lateral movement assembly.

The coupling assembly 330 can include a window assembly 325, which can house a window 320, e.g., an optical element for isolating a liquid environment of the nozzle assembly 355 with a dry environment of the laser focus optic assembly 310. The window assembly 325 can be removable attached to the coupling assembly 330, for example, by screwing the window assembly 325 to a coupling body 365 of the coupling assembly 330.

The coupling assembly 330 can include a nozzle assembly 355, which can house a nozzle 350, e.g., an element having an opening for generating a liquid jet 340 from a liquid source 345. The nozzle assembly 355 can be removable attached to the coupling assembly 330, for example, by screwing the nozzle assembly 355 to the coupling body 365 of the coupling assembly 330.

FIG. 4 illustrates a flow chart for forming a liquid jet guided laser system according to some embodiments. Operation 400 forms a window assembly having a window for a liquid jet guided laser system. The window can be attached to the window assembly by an o-ring, for example, so that the window can function to isolate top and bottom environments, e.g., isolating the top environment of the laser focus optic assembly, and the bottom environment of the liquid jet. The window assembly can include an attaching mechanism, such as teeth to screw on a coupling body.

Operation 410 forms a nozzle assembly having a nozzle for the liquid jet guided laser system. The nozzle can have an opening, for example, at a middle portion, so that when a liquid enter the nozzle, the liquid can form a liquid jet exiting the opening. The opening can be enlarged to a cone shape, for example, to improve a stabilization of the liquid jet. The nozzle can be attached to the nozzle assembly by an o-ring, for example, to confine the liquid inlet. The nozzle assembly can include an attaching mechanism, such as teeth to screw on a coupling body.

Operation 420 forms a coupling body. The coupling body can be configured to accept the window assembly at a top end of the coupling body. The coupling body can also be configured to accept the nozzle assembly at a bottom end opposite the top end. The coupling assembly can also be configured to be coupled to a laser focus optic assembly of the liquid jet guided laser system.

Operation 430 forms a coupling assembly. The coupling assembly can include the coupling body, the window assembly coupled to the coupling body, and the nozzle assembly coupled to the coupling body. Operation 440 couples the coupling assembly to the focus optic assembly of the liquid jet guided laser system.

In some embodiments, the coupling assembly can provide ease of servicing the window and the nozzle, for example, allowing servicing each of these two components separately without affecting the operation of the other. For example, the coupling assembly can allow access to the window without removing the nozzle from its operating position, e.g., from its nozzle assembly in the coupling assembly. The coupling assembly can also be mounted to a movement assembly to accurately adjust the laser focus position to the center of the nozzle hole. The movement assembly can be the mechanical link between the coupling assembly and the laser focus optic assembly.

Figure 5:
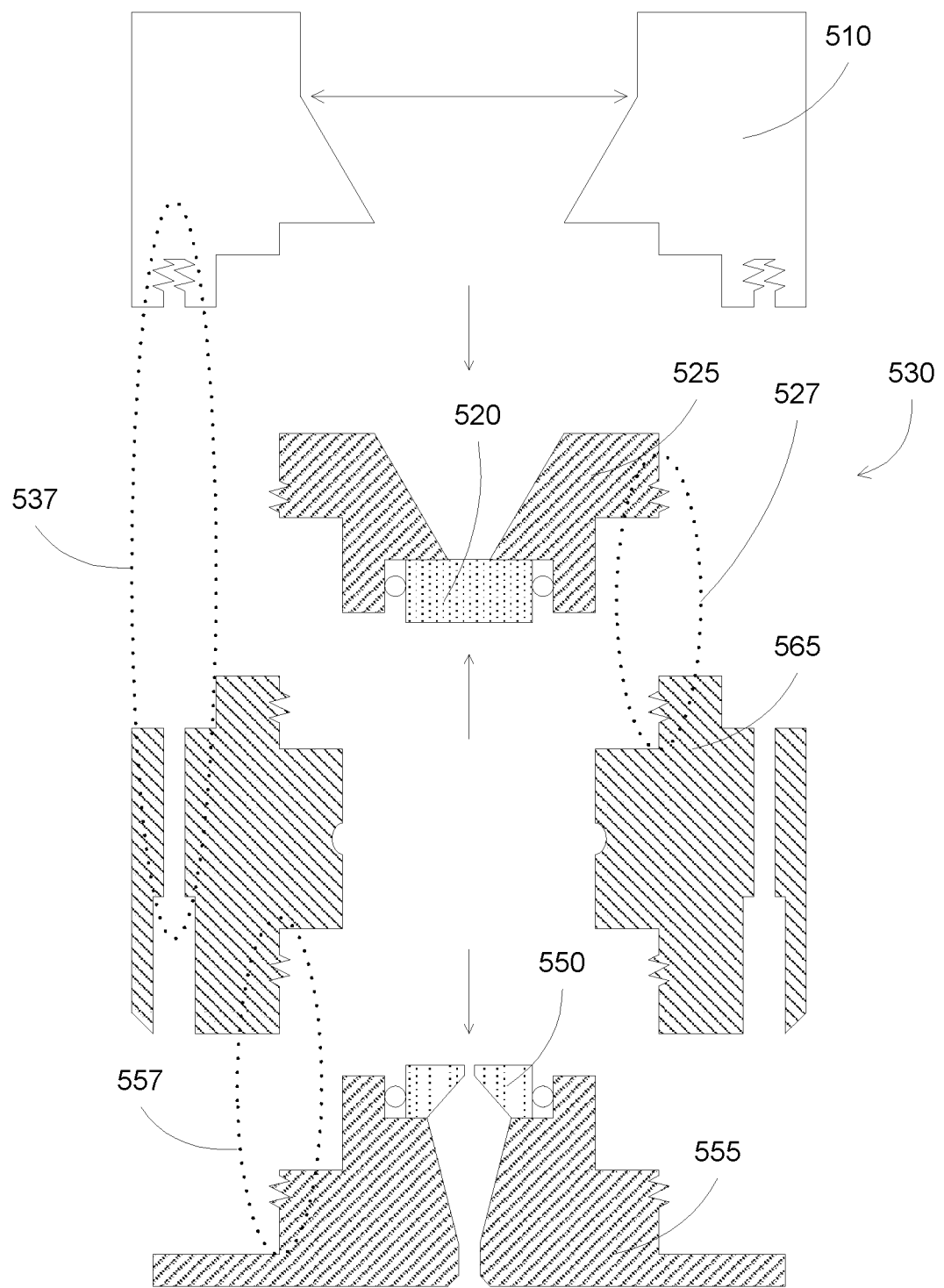
FIG. 5 illustrates components of a coupling assembly according to some embodiments.

FIG. 5 illustrates components of a coupling assembly according to some embodiments. The coupling assembly 530 can include a coupling body 565, a window assembly 525, and a nozzle assembly 555. The window assembly 525 can have an opening to press fit a window 520, for example, with an o-ring seal. The window 520 can be removed by pressing from the top opening of the window assembly, or by gripping the top portion of the window. Thus by removing the window assembly, the window can be easily removed and re-assembled. The window assembly can include an attaching mechanism 527 (e.g., treaded or bolted), for example, to couple and de-couple from the coupling body 565.

The nozzle assembly 555 can have an opening to press fit a nozzle 550, for example, with an o-ring seal. The nozzle 550 can be removed by pressing from the bottom opening of the nozzle assembly, or by gripping the top portion of the nozzle. Thus by removing the nozzle assembly, the nozzle can be easily removed and re-assembled. The nozzle assembly can include an attaching mechanism 557, for example, to couple and de-couple from the coupling body 565.

The coupling body 565 can have a corresponded attaching mechanism, e.g., attaching mechanism 527, to assemble the window assembly, for example, at a top portion of the coupling body. The coupling body 565 can have a corresponded attaching mechanism, e.g., attaching mechanism 557 (e.g., treaded or bolted), to assemble the nozzle assembly, for example, at a top portion of the coupling body. The coupling body 565 can have an attaching mechanism 537 for coupling with a laser focus optic assembly 510.

Other components can be included, for example, an air jet assembly and an air jet nozzle. Further, the coupling assembly is schematically illustrated, and there can be variations from the illustration.

Figure 6:
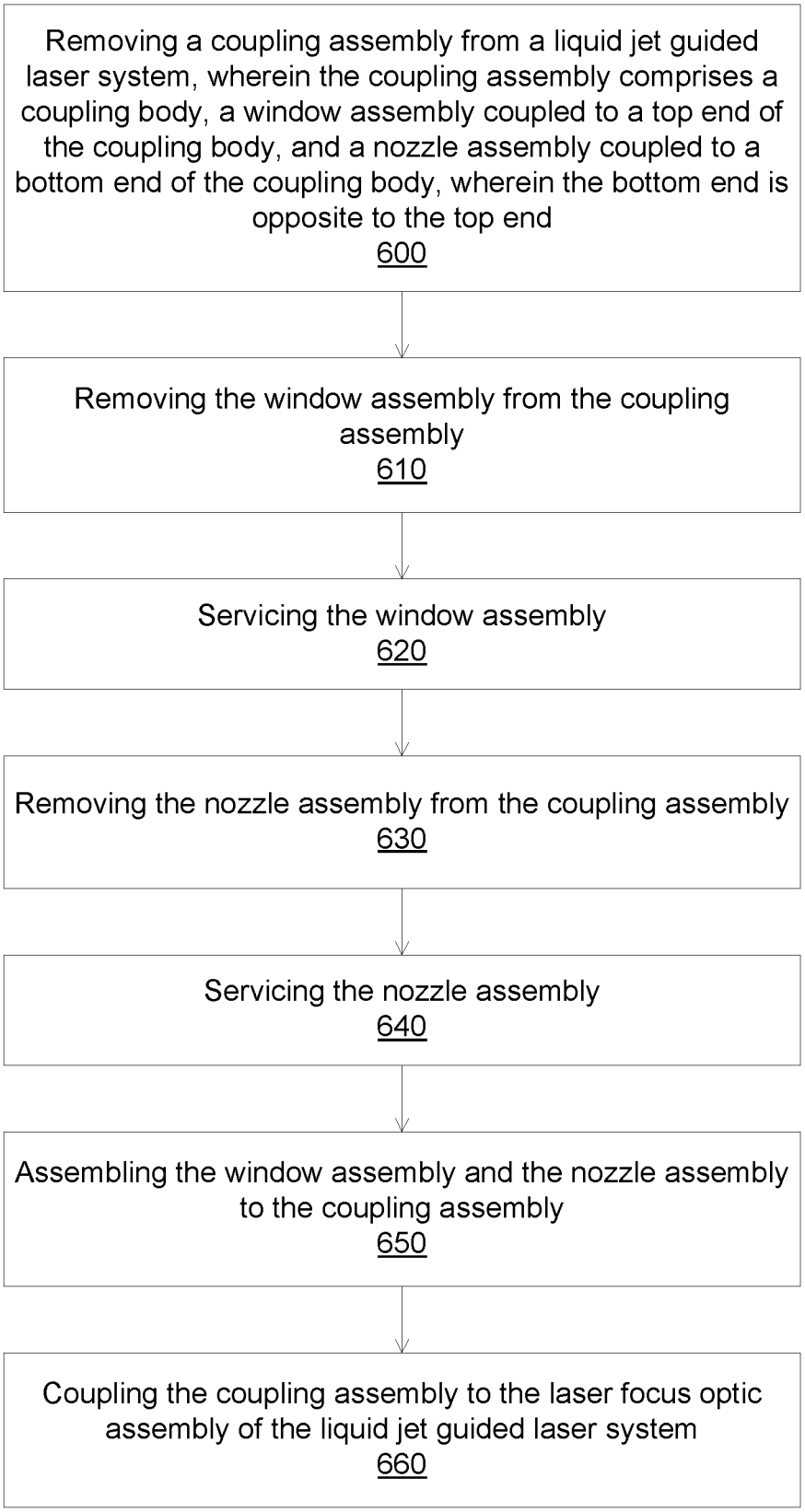
FIG. 6 illustrates a flow chart for servicing a liquid jet guided laser system according to some embodiments.

FIG. 6 illustrates a flow chart for servicing a liquid jet guided laser system according to some embodiments. Operation 600 removes a coupling assembly from a liquid jet guided laser system, wherein the coupling assembly comprises a coupling body, a window assembly coupled to a top end of the coupling body, and a nozzle assembly coupled to a bottom end of the coupling body, wherein the bottom end is opposite to the top end. After the coupling assembly is removed from the liquid jet guided laser system, the window assembly is exposed, and can be removed. Operation 610 then removes the window assembly from the coupling assembly. Operation 620 services the window assembly, for example, replacing the window. Optionally, operation 630 removes the nozzle assembly from the coupling assembly. Operation 640 services the nozzle assembly, for example, replacing the nozzle. Operation 650 assembles the window assembly and optionally the nozzle assembly to the coupling assembly. Operation 660 couples the coupling assembly to the focus optic assembly of the liquid jet guided laser system.

In some embodiments, the coupling assembly can allow servicing the window without disturbing the nozzle. The window is disposed between the laser and the nozzle, and thus, in prior art system, to access the window, the nozzle will need to be removed. The removal of the nozzle can disturb its operation, such as damaging the nozzle, thus a replacement of the window can necessitate the replacement of the nozzle.

In some embodiments, the coupling assembly can provide the exposure of the window, for example, for servicing, without disturbing the nozzle from its operation. Since the coupling assembly can be coupled to the laser focus optic assembly repeatably without losing position precision, the removal of the coupling assembly does not affect the position precision of the nozzle. Thus the window can be serviced without disturbing the nozzle operation.

Figure 7A:
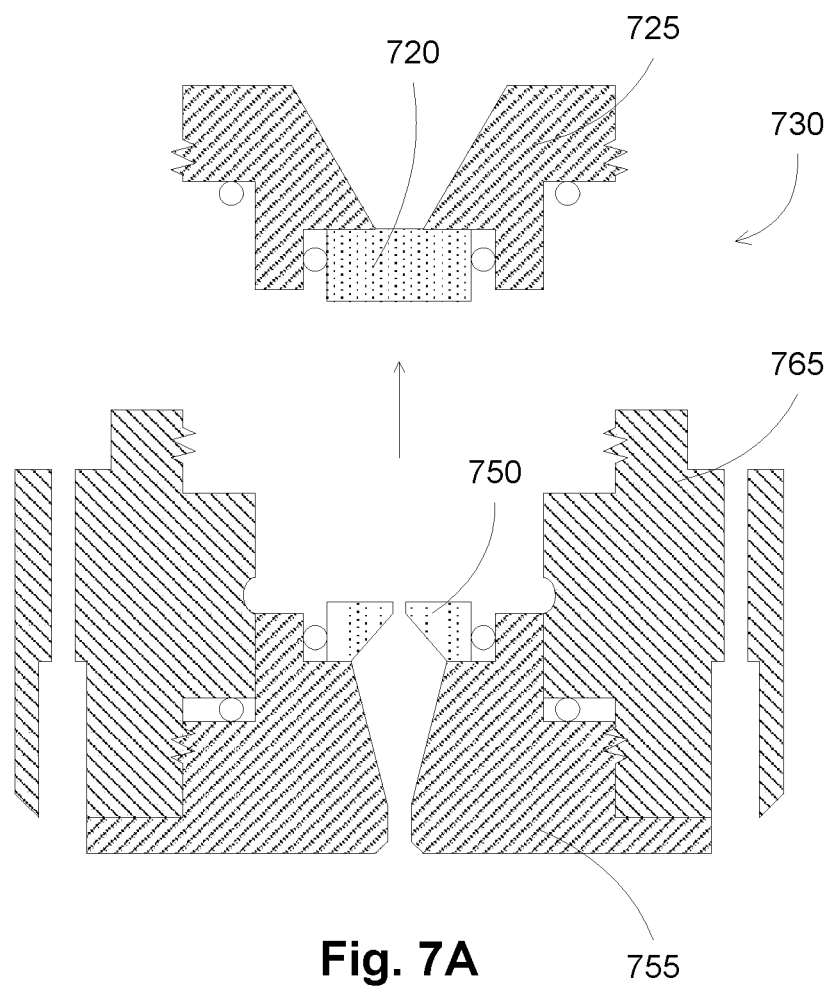
FIGS. 7A-7B illustrate a servicing operation of a window according to some embodiments.
Figure 7B:
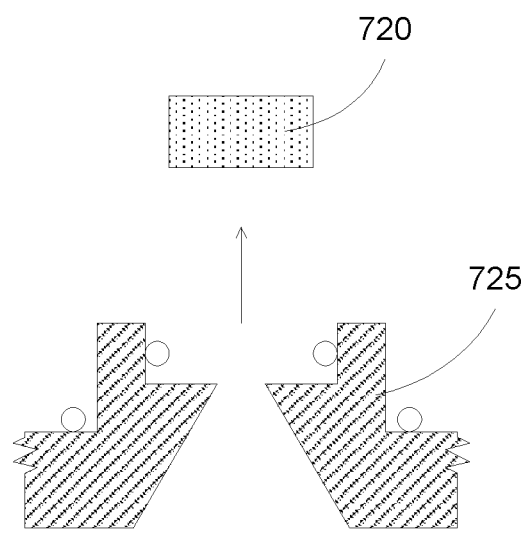

FIGS. 7A-7B illustrate a servicing operation of a window according to some embodiments. In FIG. 7A, a coupling assembly 730, after being removed from a laser focus optic assembly, can have the window assembly 725 exposed and thus the window assembly 725 can be removed from the coupling assembly 730. For example, the window assembly 725 can be detached from the coupling body 765. The removal of the window assembly 725 can be performed so that the nozzle assembly 755 is not disturbed, and thus the nozzle 750 can be returned to the original position in the laser system when the coupling assembly 730 is reassembled to the laser system.

In FIG. 7B, the window 720 can be removed from the window assembly 725, for example, by pushing from one side of the window assembly. After the window is serviced, e.g., repaired or replaced, the window can be pushed back to the window assembly, using an o-ring for sealing the window against the sidewall of the window assembly. The window assembly then can be re-attached to the coupling assembly. The coupling assembly can be re-attached to the laser system.

Figure 8:
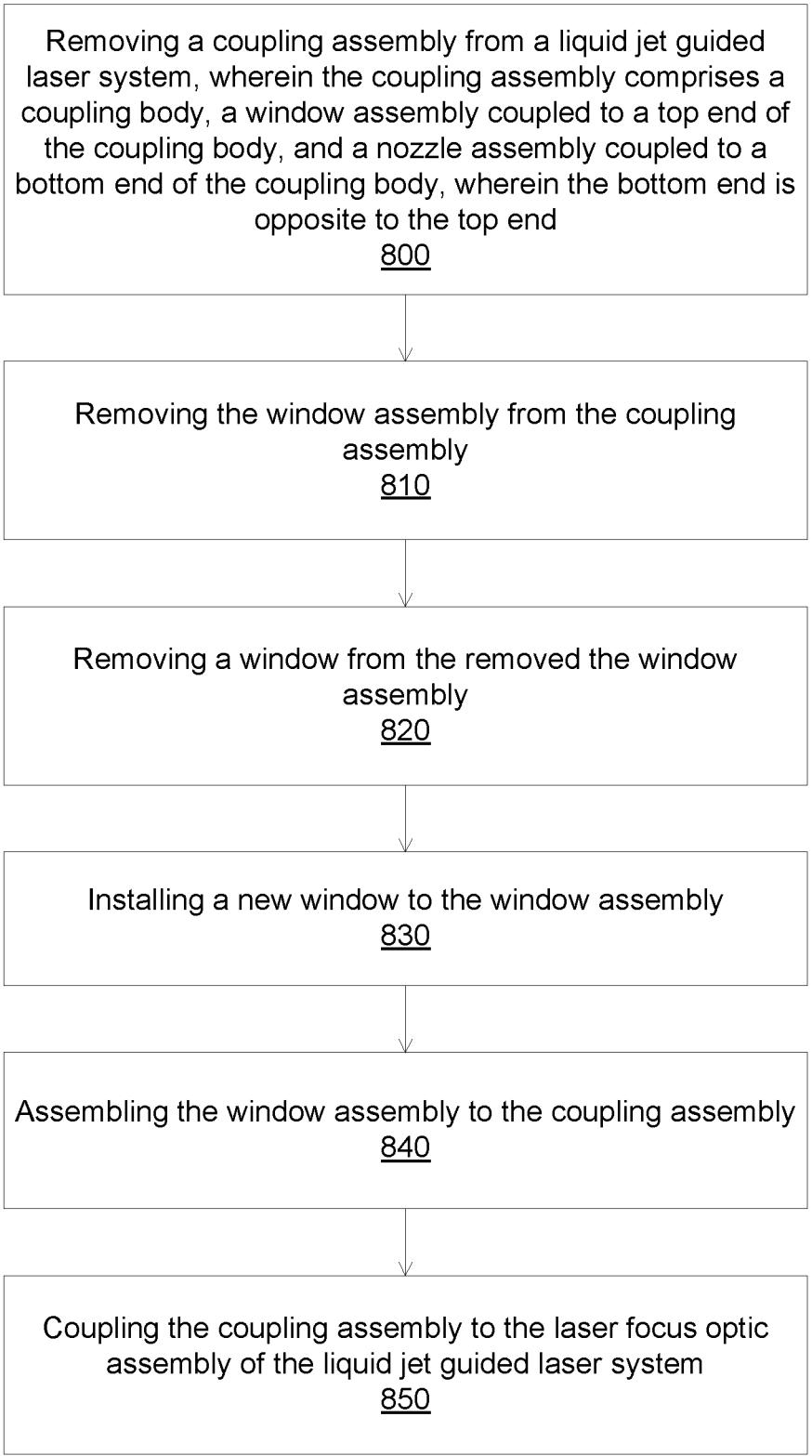
FIG. 8 illustrates a flow chart for servicing a window in a liquid jet guided laser system according to some embodiments.

FIG. 8 illustrates a flow chart for servicing a window in a liquid jet guided laser system according to some embodiments. Operation 800 removes a coupling assembly from a liquid jet guided laser system, wherein the coupling assembly comprises a coupling body, a window assembly coupled to a top end of the coupling body, and a nozzle assembly coupled to a bottom end of the coupling body, wherein the bottom end is opposite to the top end. Operation 810 removes the window assembly from the coupling assembly. Operation 820 removes a window from the removed window assembly. Operation 830 installs a new window to the window assembly. Operation 840 assembles the window assembly to the coupling assembly. Operation 850 couples the coupling assembly to the focus optic assembly of the liquid jet guided laser system.

Figure 9A:
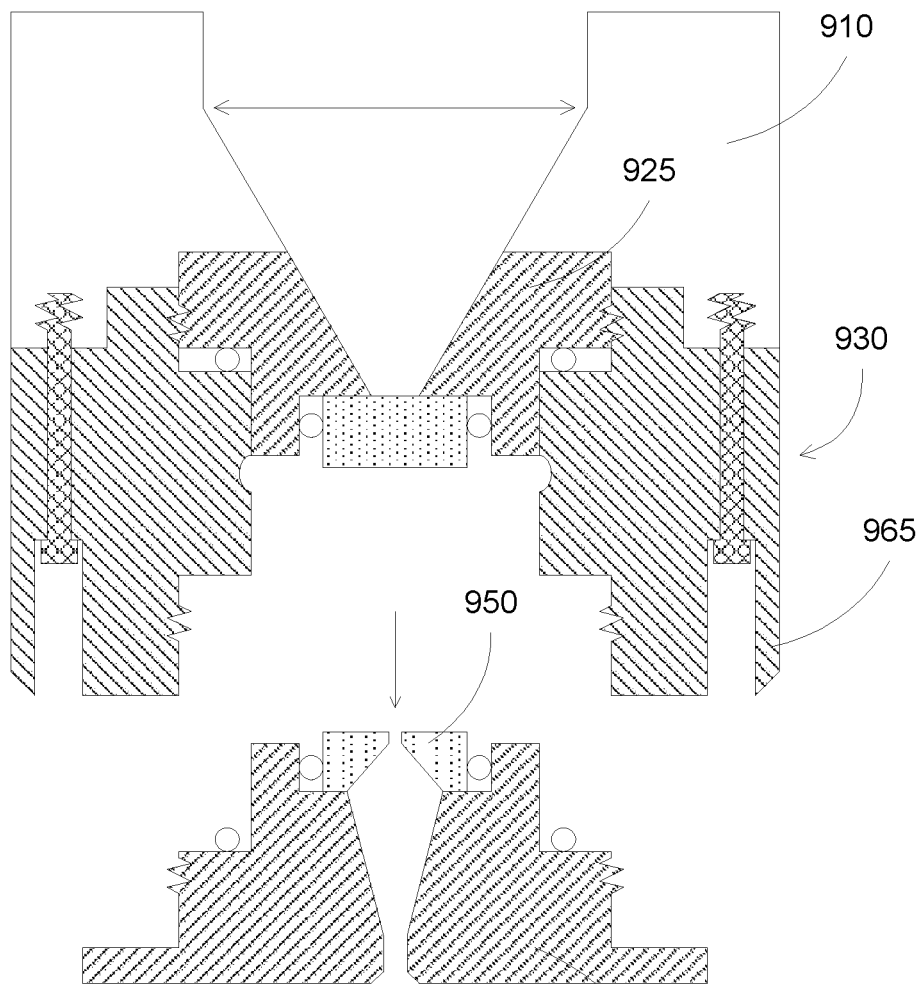
FIGS. 9A-9B illustrate a nozzle exchange operation according to some embodiments.
Figure 9B:
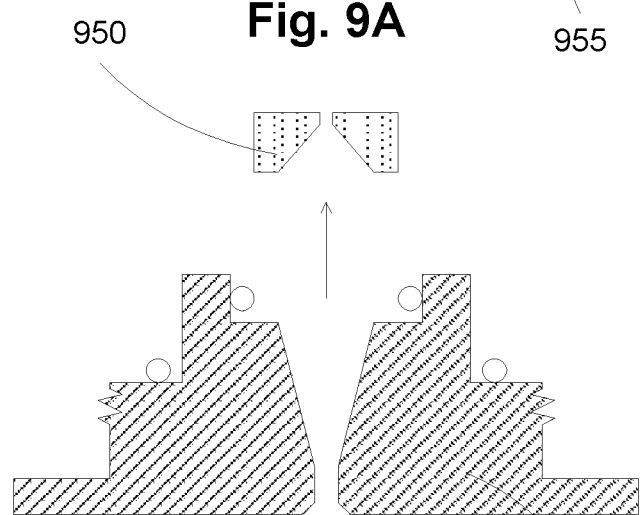

FIGS. 9A-9B illustrate a nozzle exchange operation according to some embodiments. Nozzles having certain sizes can be installed to the laser system based on the cutting requirements. For example, the nozzle can be changed from a 80 micron nozzle to a 50 micron nozzle. In FIG. 9A, a coupling assembly 930 can have the nozzle assembly 955 exposed (even when the coupling assembly is still attached to the laser focus optic assembly 910) and thus the nozzle assembly 955 can be removed from the coupling assembly 930. For example, the nozzle assembly 955 can be detached from the coupling body 965. The removal of the nozzle assembly 955 can be performed so that the window assembly 925 is not disturbed.

In FIG. 9B, the nozzle 950 can be removed from the nozzle assembly 955, for example, by pushing from one side of the nozzle assembly. After the nozzle is serviced, e.g., repaired or replaced, or exchanged to meet a job requirement the nozzle can be pushed back to the nozzle assembly, using an o-ring for sealing the nozzle against the sidewall of the nozzle assembly. The nozzle assembly then can be re-attached to the coupling assembly. The coupling assembly can be re-attached to the laser system.

FIG. 10 illustrates a flow chart for servicing a nozzle in a liquid jet guided laser system according to some embodiments. Operation 1000 provides a liquid jet guided layer system having a coupling assembly, wherein the coupling assembly is coupled to the liquid jet guided laser system, wherein the coupling assembly comprises a coupling body, a window assembly coupled to a top end of the coupling body, and a nozzle assembly coupled to a bottom end of the coupling body, wherein the bottom end is opposite to the top end. Operation 1010 removes the nozzle assembly from the coupling assembly. Operation 1020 removes a nozzle from the removed the nozzle assembly. Operation 1030 installs a new nozzle to the nozzle assembly. Operation 1040 assembles the nozzle assembly to the coupling assembly.

Figure 11A:
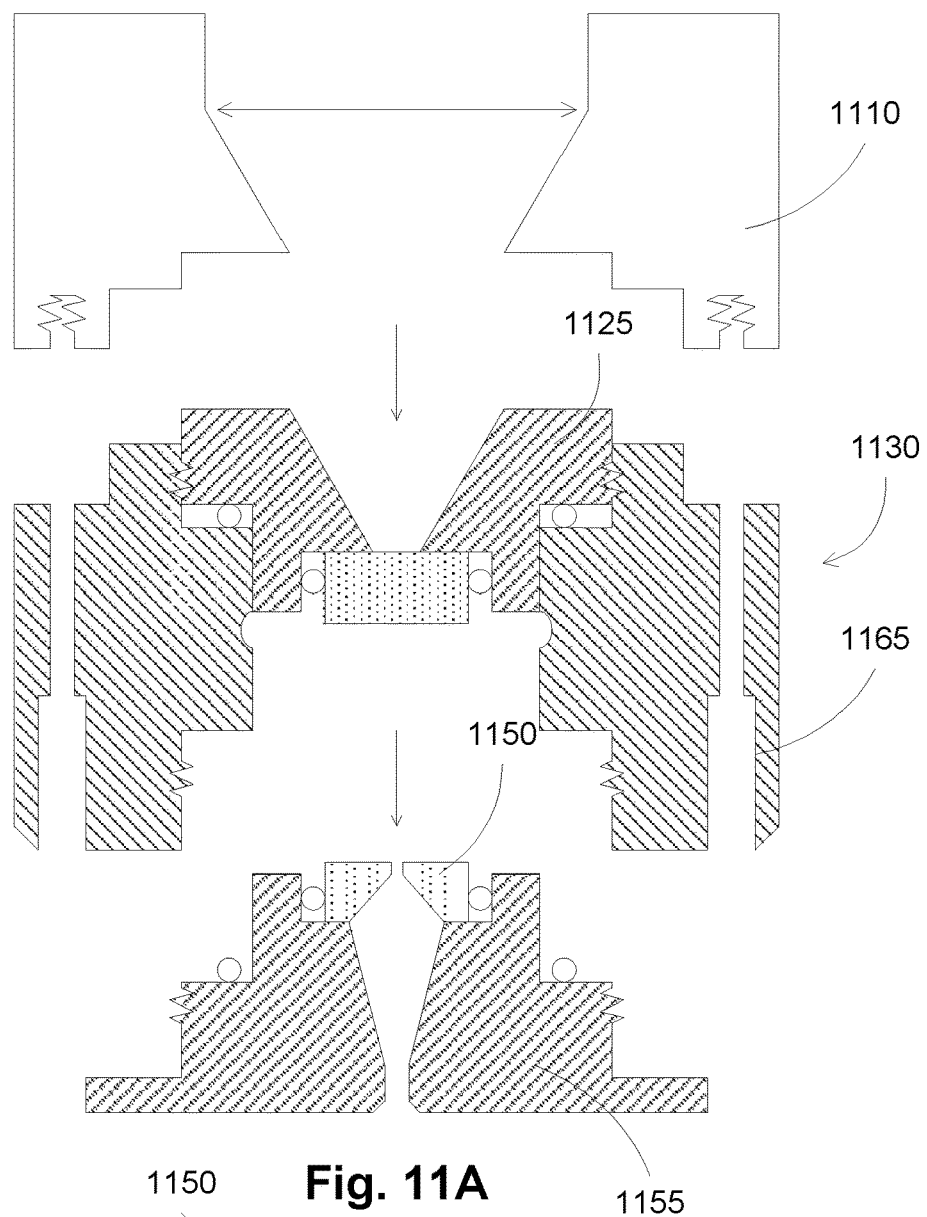
FIGS. 11A-11B illustrate a servicing operation of a nozzle according to some embodiments.
Figure 11B:
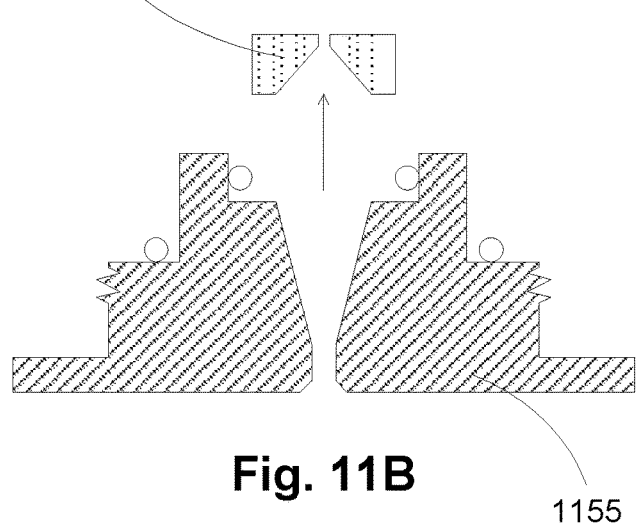

FIGS. 11A-11B illustrate a servicing operation of a nozzle according to some embodiments. In FIG. 11A, a coupling assembly 1130, after being removed from a laser focus optic assembly, can have the nozzle assembly 1155 exposed (even when the coupling assembly is still attached to the laser focus optic assembly 1110) and thus the nozzle assembly 1155 can be removed from the coupling assembly 1130. For example, the nozzle assembly 1155 can be detached from the coupling body 1165. The removal of the nozzle assembly 1155 can be performed so that the window assembly 1125 is not disturbed, when the coupling assembly 1130 is reassembled to the laser system.

In FIG. 11B, the nozzle 1150 can be removed from the nozzle assembly 1155, for example, by pushing from one side of the nozzle assembly. After the nozzle is serviced, e.g., repaired or replaced, or exchanged to meet a job requirement the nozzle can be pushed back to the nozzle assembly, using an o-ring for sealing the nozzle against the sidewall of the nozzle assembly. The nozzle assembly then can be re-attached to the coupling assembly. The coupling assembly can be re-attached to the laser system.

Figure 12:
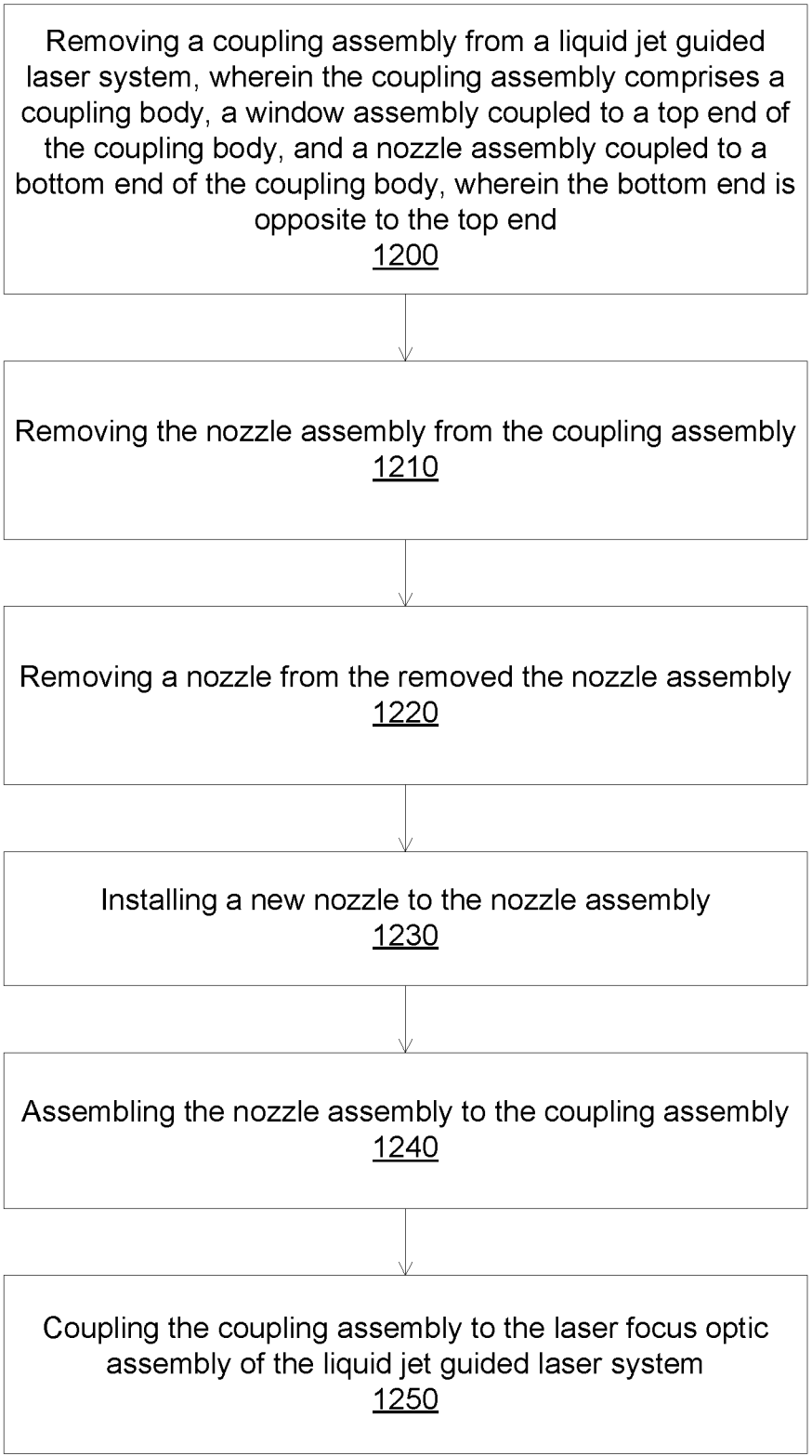
FIG. 12 illustrates a flow chart for servicing a nozzle in a liquid jet guided laser system according to some embodiments.

FIG. 12 illustrates a flow chart for servicing a nozzle in a liquid jet guided laser system according to some embodiments. Operation 1200 removes a coupling assembly from a liquid jet guided laser system, wherein the coupling assembly comprises a coupling body, a window assembly coupled to a top end of the coupling body, and a nozzle assembly coupled to a bottom end of the coupling body, wherein the bottom end is opposite to the top end. Operation 1210 removes the nozzle assembly from the coupling assembly. Operation 1220 removes a nozzle from the removed the nozzle assembly. Operation 1230 installs a new nozzle to the nozzle assembly. Operation 1240 assembles the nozzle assembly to the coupling assembly. Operation 1250 couples the coupling assembly to the focus optic assembly of the liquid jet guided laser system.

In some embodiments, the coupling assembly in the liquid guided laser jet can include an air jet nozzle. The air jet nozzle can be coupled to the nozzle assembly. Enclosed is a brief description of the air jet nozzle in the coupling assembly. Further details can be found in co-pending patent application Ser. No. 14/535,341 of the same inventors, hereby incorporated by reference in its entirety for all purposes.

An air jet nozzle can be configured to provide a surrounding air jet with respect to the liquid jet. The surrounding air jet can clear any accumulated liquid on a workpiece surface to prevent degradation of the laser process, for example, due to the accumulated liquid interfering with the internal reflection of the laser beam. The air jet nozzle can form a partition between the air jet and the liquid jet, e.g., the liquid jet and the air jet exit the coupling unit at two separate nozzle openings. The air jet nozzle can provide a separation, which can allow for the independent control of the air jet, e.g., controlling the pressure and flow rate to achieve an optimum surface clearing process while not interfering with the liquid jet operation.

An air jet nozzle can be coupled to the nozzle, for example, closing the cavity of the nozzle and guiding the liquid jet to the exit. The air jet nozzle can surround the liquid jet, and form an air jet in a parallel direction with the liquid jet.

Figure 13:
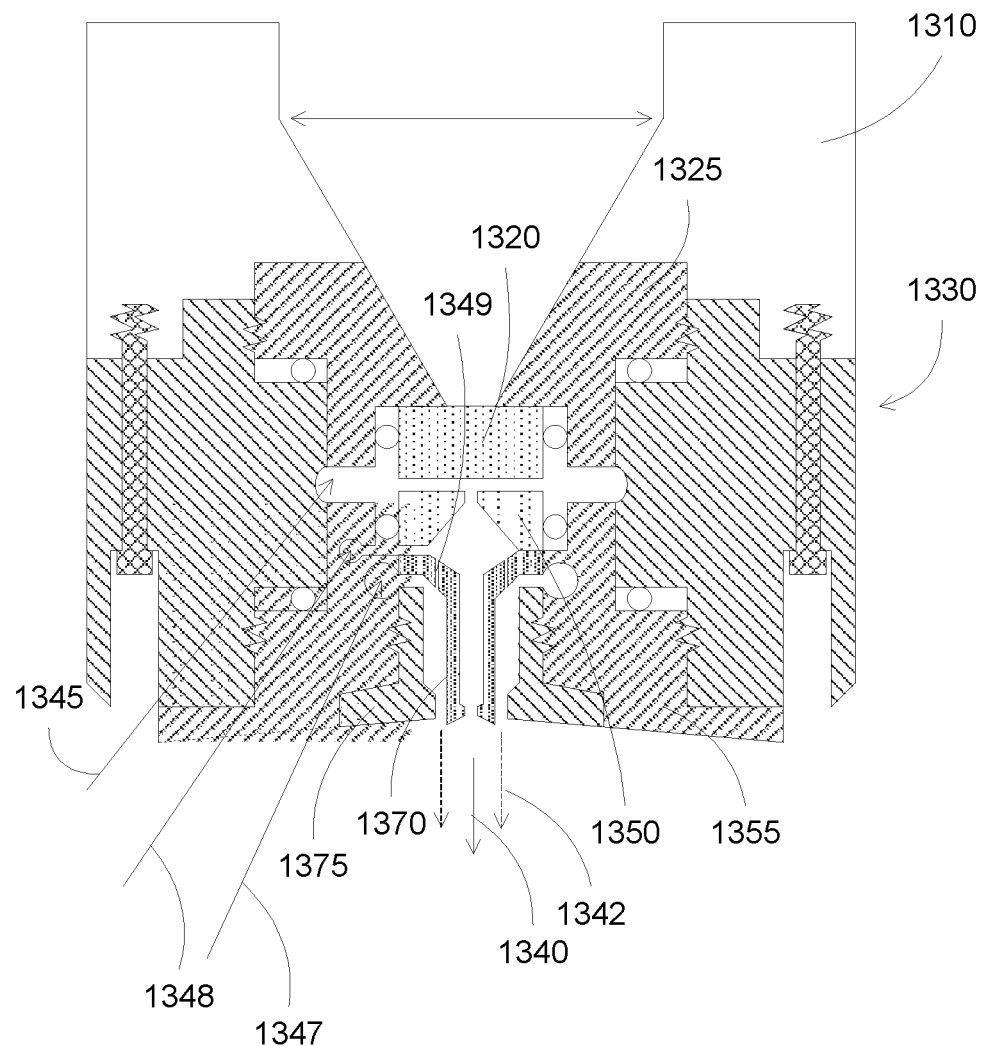
FIG. 13 illustrates a coupling assembly having an air jet nozzle according to some embodiments.

FIG. 13 illustrates a coupling assembly having an air jet nozzle according to some embodiments. A liquid jet guided laser system can include a laser focus optic assembly 1310, and a coupling assembly 1330 for coupling the laser beam in the laser system with a liquid jet 1340. The coupling assembly 1330 can be removably coupled to the laser focus optic assembly 1310, e.g., the coupling assembly can be secured to the laser focus optic assembly 1310 by an attachment mechanism, such as a bolt mechanism. The attachment mechanism can be configured to provide repeatable assembling and de-assembling without loss of position accuracy and precision. Thus the components of the coupling assembly, e.g., the window 1320 and the nozzle 1350, can be removed and re-assembled to the laser focus optic assembly (when still coupled to the coupling assembly) without affecting the operation of these components.

The coupling assembly 1330 can include a window assembly 1325, which can include an optical element, such as a window 1320, to isolate the liquid 1340 from the laser focus optic assembly 1310. The laser system 1310 can include a laser beam, which can be focused to the liquid, such as to the liquid portion or the liquid jet portion, to form internal reflection in the liquid jet.

The coupling assembly 1330 can include a nozzle assembly 1355, which can include a nozzle 1350. The nozzle 1350 can be disposed in parallel to the window 1320, so that a liquid 1345 can enter the gap between the nozzle and the window, and then exit the opening of the nozzle to form a liquid jet 1340.

In some embodiments, the nozzle can have a cavity at the outlet of the nozzle, to optimize the liquid jet, such as to stabilize the liquid jet. The cavity can have a low pressure, e.g., lower than an outside ambient pressure. The low pressure, e.g., vacuum condition, can generate turbulence in the liquid jet formation. A gas can be delivered, actively from a gas source, or passively in a form of conduits from a higher pressure environment, to the cavity of the nozzle to compensate for the vacuum pressure. The gas can be provided from a separate gas source 1348, or from the air jet through slots 1349 in the air jet nozzle. For example, a hole in the air jet nozzle can reduce the vacuum level, e.g., increasing the pressure, in the cavity of the nozzle area. The air jet can be generated from a gas supply line, 1347 which can include a compressed gas with a pressure less than 10 bar, or a compressed gas with a maximum pressure of 10 bar. The pressure of the gas supply line can be configured to be independently adjustable with respect to the liquid jet.

An air jet nozzle assembly can be coupled to the nozzle assembly. The air jet nozzle assembly can include an air jet nozzle 1370 and an air jet nozzle support 1375, which can be coupled to the nozzle assembly 1355. The air jet nozzle 1370 can include an inner conduit for the liquid jet to pass through. The air jet nozzle can be configured to physically separate the liquid jet 1340 from an air jet 1342, such as shielding the liquid jet from external influence, such as shielding the liquid jet from the air jet. The air jet nozzle can have a hollow cylinder shape, with the hollow portion larger than a diameter of the liquid jet for passing the liquid jet. The hollow cylinder can have a top larger opening for coupling with a cavity in the nozzle module. The hollow cylinder can have a straight conduit portion to guide the liquid jet for forming a laminar flow.

Different air jet nozzles can be used. An air jet nozzle can have a vertical outer surface, e.g., a surface parallel with the vertical flow of the liquid jet, to form an air jet running substantially parallel with the liquid jet. An air jet nozzle can have an outward vertical outer surface, e.g., a surface making a diverged angle with the vertical flow of the liquid jet, to form an air jet diverged from the liquid jet when hitting the object surface. An air jet nozzle can have an inward vertical outer surface, e.g., a surface making a converged angle with the vertical flow of the liquid jet, to form an air jet converged with the liquid jet in the direction of the object surface.

In some embodiments, the air jet can form an angle with the liquid jet, for example, to optimize the operation of the liquid jet guided laser operation. In general, an air jet can be provided so that the air jet impacts the surface of the workpiece at a location at or near the location that the liquid jet impacts the surface. Due to the potential interference between the air jet and the liquid jet outside of the liquid and gas sources, the air jet can be diverged from the liquid jet.

For example, for a workpiece that can be placed near, e.g., a small distance (about less than 2 cm, less than 1 cm, or less than 0.5 cm) to the liquid jet guided laser system, the air jet can be directed toward the liquid jet, such as between 0 and −20 degrees, or between 0 and −10 degrees. The angle between the air jet and the liquid jet can be defined as a negative angle if the air jet is directed toward the liquid jet from the direction from the laser system to the workpiece. The small distance can be used if the workpiece is concave down or flat, allowing the laser system to travel across the workpiece without interference. In addition, the air jet can have low pressure and low flow due to the small distance. For example, operating conditions (such as pressure and flow) of a gas source can be regulated to generate an air jet having low pressure and low flow.

For a workpiece that can be placed a little farther, e.g., a medium distance (about less than 6 cm, less than 2 cm, or less than 1 cm) to the liquid jet guided laser system, the air jet can be directed substantially parallel to the liquid jet, such as deviating less than 1 or 2 degrees from the parallel direction. The medium distance can be used if the workpiece is flat, allowing the laser system to travel across the workpiece without interference. In addition, the air jet can have medium pressure and medium flow due to the medium distance. For example, operating conditions (such as pressure and flow) of a gas source can be regulated to generate an air jet having medium pressure (such as less than 6 bar or less than 2 bar pressure) and medium flow (such as less than 6 or less than 2 standard liters per minute).

For a workpiece that can be placed far, e.g., a large distance (about greater than 1 cm, greater than 6 cm, or greater than 10 cm) to the liquid jet guided laser system, the air jet can be directed away from the liquid jet, such as between 0 and 45 degrees, or between 0 and 30 degrees. The angle between the air jet and the liquid jet can be defined as a positive angle if the air jet is directed away from the liquid jet from the direction from the laser system to the workpiece. The large distance can be used if the workpiece has irregular surface topology, such as a cavity that recesses under a top surface of the workpiece. For large distances, the air jet pressure of flow might need to be increased, for example, to travel the large distances and to clear liquid from a cavity. For example, operating conditions (such as pressure and flow) of a gas source can be regulated to generate an air jet having high pressure (such as less than 10 bar or less than 6 bar pressure) and high flow (such as less than 10 or less than 6 standard liters per minute). The high pressure and flow can potential interfere with the liquid jet, for example, by shortening the laminar length of the liquid jet, if running parallel or toward the liquid jet.

In some embodiments, the present invention discloses methods to replace the air jet nozzle depending on the operating conditions, such as the topology of the workpiece. An air jet nozzle that can provide a substantially parallel air jet flow with the liquid jet can be used for workpieces with shallow topology, e.g., workpieces with no deep cavities. In addition, low to medium air jet pressure and flow can be used.

An air jet nozzle that can provide a diverged air jet flow with the liquid jet can be used for workpieces with deep topology. In addition, high air jet pressure and flow can be used.

In some embodiments, the present invention discloses methods and systems for adjusting a focus of the laser beam in a liquid jet guided laser system. The laser beam and the nozzle can be assembled so that the laser beam can be focused to the liquid jet. A lateral motion mechanism can be coupled between the laser focus optic assembly and the coupling assembly, thus allowing the coupling assembly to move in a lateral plane, which is perpendicular to the direction of the laser beam. The movement of the coupling assembly can place the nozzle opening directly on the path of the laser beam.

Figure 14:
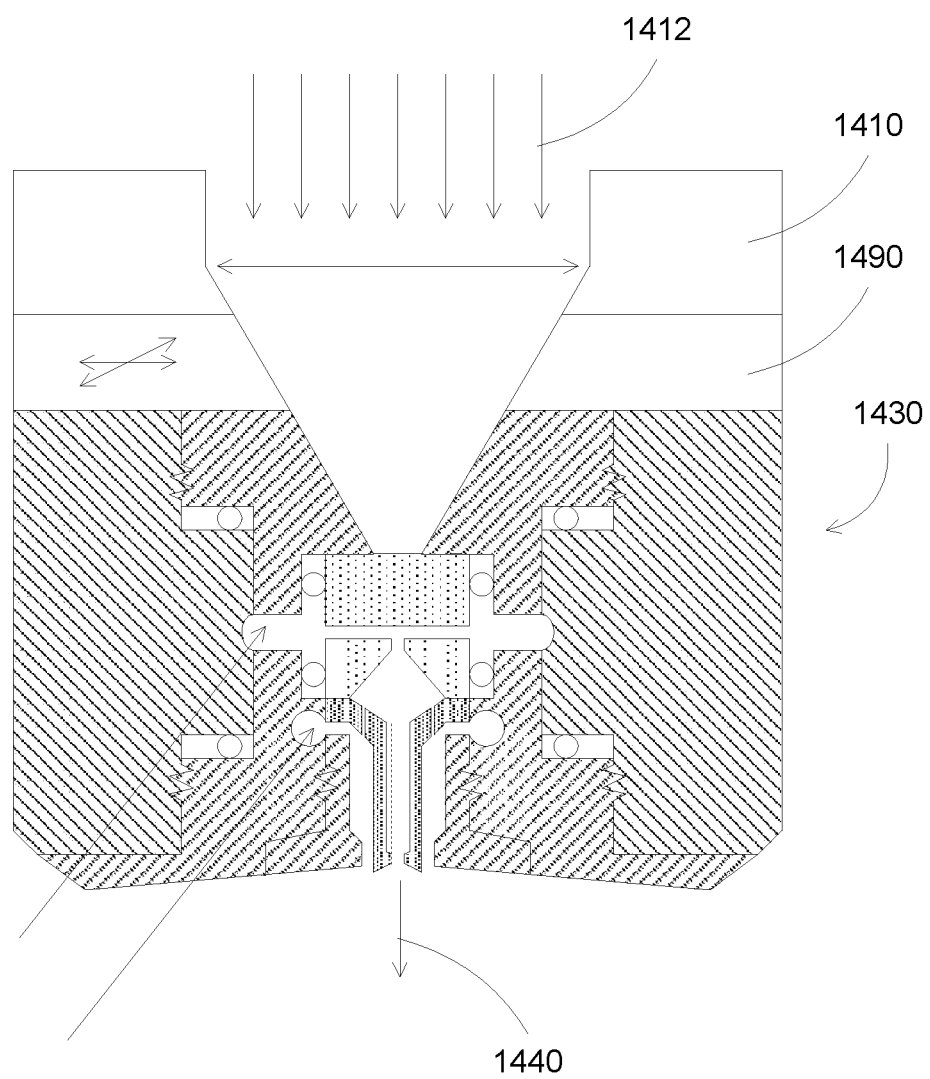
FIG. 14 illustrates a liquid jet guided laser system according to some embodiments.

FIG. 14 illustrates a liquid jet guided laser system according to some embodiments. A laser focus optic assembly 1410 can be coupled to a coupling assembly 1430 through a lateral movement mechanism 1490. The lateral movement mechanism 1490 can be configured to move the coupling assembly 1430 (relative to the laser focus optic assembly 1410) in a lateral plane perpendicular to the laser beam direction 1412. By moving the coupling assembly, the opening of the nozzle can be put precisely under the focus spot of the laser beam, allowing the laser beam to form internal reflection in the liquid jet and to avoid partly impact of laser energy to the nozzle cavity. The lateral movement of the coupling assembly can provide a laser beam running parallel with the liquid jet 1440.

FIG. 15 illustrates a flow chart for operating a liquid jet guided laser system according to some embodiments. Operation 1500 couples a coupling assembly to the focus optic assembly of a liquid jet guided laser system. The motion controller is configured to move the coupling assembly relative to the laser system in a lateral plane perpendicular to the laser beam direction. Operation 1510 moves the coupling assembly relative to the liquid jet guided laser system through the motion controller, for example, moving the nozzle hole relative to the laser focus spot.

Figure 16A:
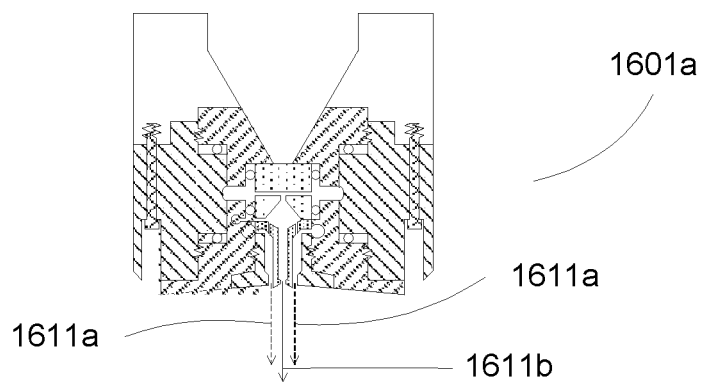
FIG. 16A-16C illustrates a liquid jet guided laser system according to some embodiments.
Figure 16B:
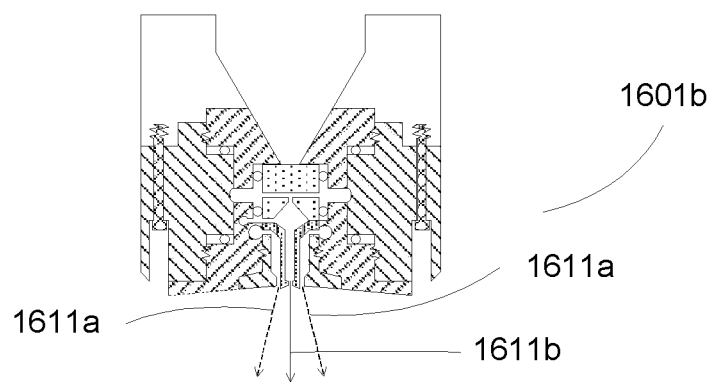
Figure 16C:
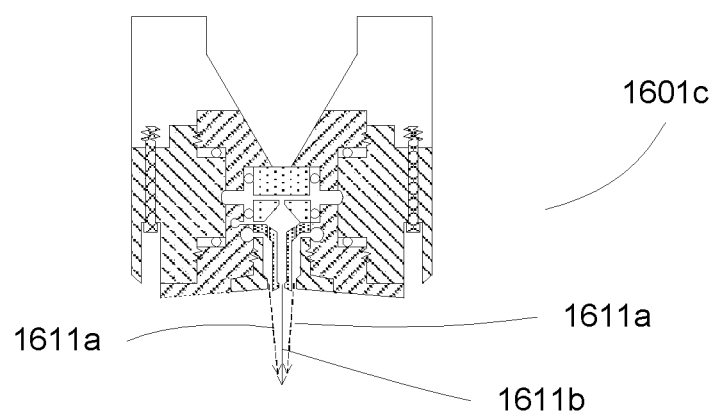

FIG. 16A-16C illustrates a liquid jet guided laser system according to some embodiments. FIG. 16A illustrates an assembly 1601a which teaches to an ability for the air jets 1611a to be parallel with the liquid jet 1611b. FIG. 16B illustrates an assembly 1601b which teaches to an ability for the air jets 1611a to be at a positive angle with the liquid jet 1611b. FIG. 16C illustrates an assembly 1601a which teaches to an ability for the air jets 1611a to be a negative with the liquid jet 1611b.

What is claimed is:

1. A method for using a liquid jet guided laser system comprising:
   providing a coupling module for the liquid jet guided laser system,
       wherein the coupling module comprises:
           a body, a window assembly and a nozzle assembly,
           wherein the coupling module is configured to be removably attached to a laser focus optic module of the liquid jet guided laser system;
   inserting a window to the window assembly;
   inserting the window assembly to the coupling module,
       wherein the window assembly is configured to be removably attached to the body at a first surface,
       wherein the first surface faces the laser focus optic module with the window assembly configured to face the laser focus optic module;
   inserting the nozzle assembly to the body, wherein the nozzle assembly is removably attached to the body at a second surface opposite the first surface;

inserting the coupling module to the liquid jet guided laser system, wherein the coupling module is configured to allow independent removal of the window in the window assembly and a nozzle in the nozzle assembly, wherein the nozzle assembly comprises an air jet nozzle assembly for forming an air jet surrounding a liquid jet generated by the nozzle, wherein the air jet nozzle assembly forms a partition between the air jet and the liquid jet, wherein the air jet and the liquid jet exit the coupling module at two separate openings, wherein the air jet and liquid jet are configured to not merge before contacting the workpiece.

2. A The method as in claim 1,
wherein the coupling module is mounted to the laser focus optic module of the liquid jet guided laser system.

3. The method as in claim 1, wherein for servicing the liquid jet guided laser system, the method further comprises:
removing the coupling module from the liquid jet guided laser system;
removing the window assembly from the coupling module;
removing the window from the window holder assembly.

4. A The method as in claim 3, further comprising:
reinserting the removed window or another window to the window assembly;
reinserting the window assembly to the coupling module;
reinserting the coupling module to the liquid jet guided laser system.

5. A The method as in claim 4,
wherein the removing and reinserting the coupling module is performed according to a job requirement.

6. The method as in claim 1, wherein for servicing the liquid jet guided laser system, the method further comprises:
removing the nozzle assembly from the coupling module;
removing the nozzle from the nozzle assembly.

7. The method as in claim 6, further comprising:
reinserting the removed nozzle or another nozzle to the nozzle assembly;
reinserting the nozzle assembly to the coupling module.

8. A The method as in claim 7,
wherein the removing and reinserting the nozzle from the nozzle assembly is performed according to a job requirement.

9. A The method as in claim 1,
wherein the coupling module moves independently relative to the liquid jet guided laser system.

10. A The method as in claim 9,
wherein the movement moves the nozzle and a nozzle hole relative to a laser focus spot.

11. A method for using a liquid jet guided laser system comprising:
providing a coupling module for the liquid jet guided laser system, wherein the coupling module comprises:
a body, a window assembly and a nozzle assembly,
wherein the coupling module is configured to be removably attached to a laser focus optic module of the liquid jet guided laser system;
inserting a window to the window assembly;
inserting the window assembly to the coupling module,
wherein the window assembly is configured to be removably attached to the body at a first surface,
wherein the first surface faces the laser focus optic module with the window assembly configured to face the laser focus optic module;
inserting the nozzle assembly to the body,
wherein the nozzle assembly is removably attached to the body at a second surface opposite the first surface;
inserting the coupling module to the liquid jet guided laser system,
wherein the coupling module is mounted to the laser focus optic module through a lateral movement assembly;
wherein the lateral movement assembly is configured to allow adjusting positions of the coupling module in a plane perpendicular to a laser beam of the liquid jet guided laser system.

12. The method as in claim 4, wherein for servicing the liquid jet guided laser system, the method further comprises:
removing the coupling module from the liquid jet guided laser system;
removing the window assembly from the coupling module;
removing the window from the window assembly.

13. The method as in claim 12, further comprising:
reinserting the window or a second window to the window assembly;
reinserting the window assembly to the coupling module;
reinserting the coupling module to the liquid jet guided laser system.

14. The method as in claim 13,
wherein the removing and reinserting the coupling module is performed according to a job requirement.

15. The method as in claim 11, wherein for servicing the liquid jet guided laser system, the method further comprises:
removing the nozzle assembly from the coupling module;
removing a nozzle from the nozzle assembly.

16. The method as in claim 15, further comprising:
reinserting the nozzle or a second nozzle to the nozzle assembly;
reinserting the nozzle assembly to the coupling module.

17. The method as in claim 16,
wherein the removing and reinserting the nozzle or a second nozzle from the nozzle assembly is performed according to a job requirement.

18. The method as in claim 11
wherein the coupling module moves laterally and independently relative to the liquid jet guided laser system.

19. The method as in claim 18,
wherein the movement moves a nozzle in the nozzle assembly and a nozzle hole relative to a laser focus spot.

* * * * *